United States Patent [19]

Wuttke

[11] Patent Number: 4,762,001

[45] Date of Patent: Aug. 9, 1988

[54] ARRANGEMENT FOR IDENTIFYING THE POSITION OF A MOVABLE BODY WITH ULTRASOUND

[75] Inventor: Gero Wuttke, Regensburg, Fed. Rep. of Germany

[73] Assignee: Siemens Aktiengesellschaft, Berlin and Munich, Fed. Rep. of Germany

[21] Appl. No.: 66,521

[22] Filed: Jun. 26, 1987

[30] Foreign Application Priority Data

Jul. 3, 1986 [DE] Fed. Rep. of Germany ....... 3622368

[51] Int. Cl.⁴ .............................................. G01N 29/04
[52] U.S. Cl. ...................................... 73/597; 367/902; 367/127
[58] Field of Search .......................... 73/597, 602, 628; 367/908, 902, 903, 127, 125, 124, 99, 100

[56] References Cited

U.S. PATENT DOCUMENTS

| | | | |
|---|---|---|---|
| 3,757,285 | 9/1973 | Ferre | 367/902 |
| 4,543,649 | 9/1985 | Head et al. | 367/902 |
| 4,545,249 | 10/1985 | Matay | 367/125 |

FOREIGN PATENT DOCUMENTS

| | | | |
|---|---|---|---|
| 52-58945 | 5/1977 | Japan | 73/628 |
| 222707 | 7/1985 | Japan | 73/627 |

Primary Examiner—Stewart J. Levy
Assistant Examiner—Louis M. Arana
Attorney, Agent, or Firm—Hill, Van Santen, Steadman & Simpson

[57] ABSTRACT

For identifying the position of a movable body comprising a reflector, a primary transducer and a secondary transducer are utilized which transmit ultrasonic pulses to the reflector and, in turn, detect the ultrasonic pulses reflected by the reflector. A measuring device identifies a positional value assigned to the position of the reflector from the transit times of the ultrasonic pulses from both transducers. To this end, the measuring equipment has a primary control to which a calculator, a primary memory, a timer and a pilot control are coupled. Furthermore, the measuring equipment has a receiver, a transmitter and a transfer device which alternately connects the ultrasonic transducers to the measuring equipment.

7 Claims, 1 Drawing Sheet

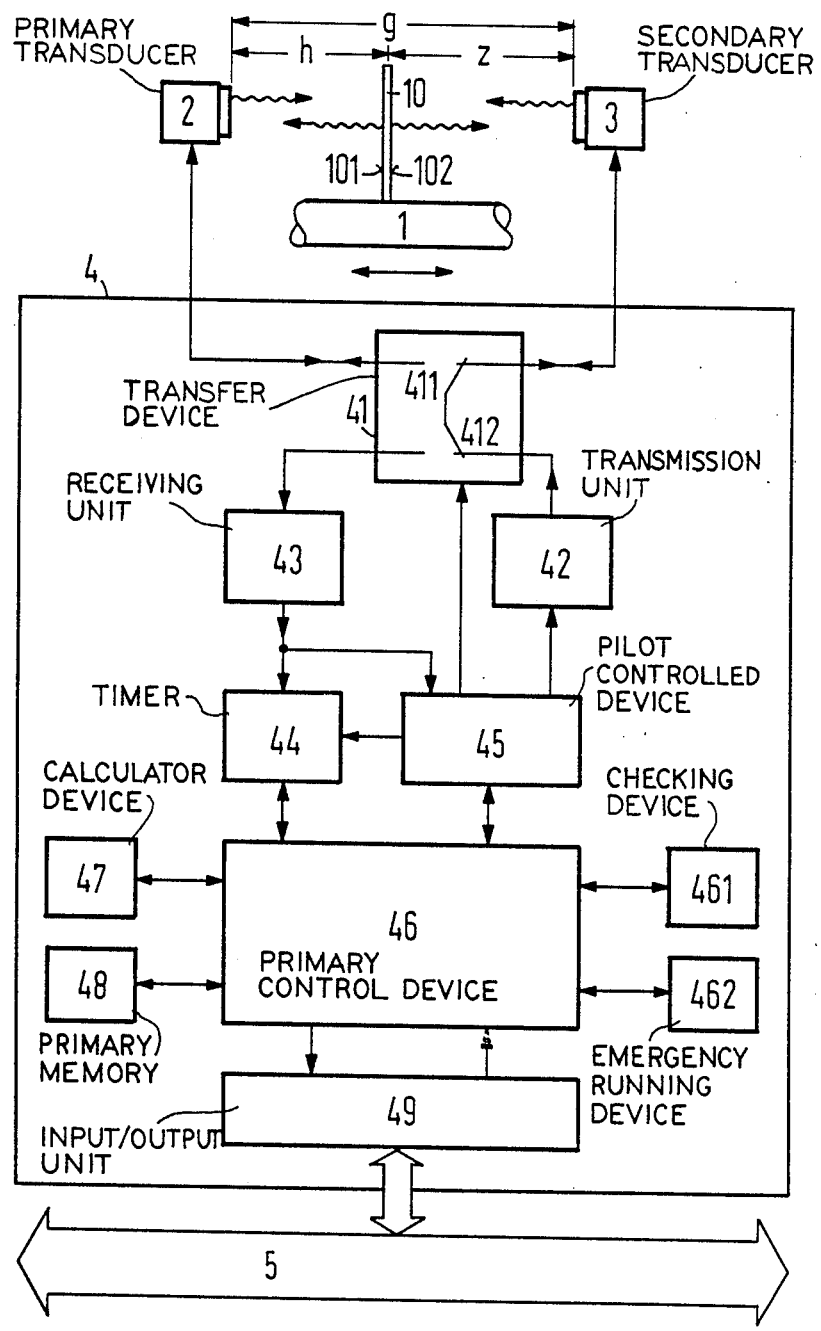

ARRANGEMENT FOR IDENTIFYING THE POSITION OF A MOVABLE BODY WITH ULTRASOUND

BACKGROUND OF THE INVENTION

1. Field of the Invention

The present invention is directed to an arrangement for identifying the position of a movable body with ultrasound, comprising a main transducer that serves as a transmitter and a receiver for ultrasonic pulses, a reflector attached to the body and having a reflecting front side and rear side which reflects an ultrasonic pulse transmitted from the main transducer from the front side back in the direction of the main transducer, a measuring device to which the main transducer is connected and which identifies a principal transit time per ultrasonic pulse which requires a long principal distance between the main transducer and reflector from the main transducer to the reflector and back, and which identifies a position value therefrom that represents the position of the reflector relative to a reference position having a reference distance from the main transducer.

2. Description of the Prior Art

In known arrangements of the type set forth above, the principal distance between the main transducer and the reflector that is attached to a body is identified as a position value by measuring the transit time of an ultrasonic pulse in a medium between the main transducer and the reflector, referred to as the principal transit time hereinbelow, and being identified according to the following equation $$L_1 = \tfrac{1}{2} \cdot t_1 \cdot v(\theta) \tag{1}$$

where $t_1$ is the principal transit time of the ultrasonic pulse, $v(\theta)$ denotes the propagation speed of the ultrasonic pulse in the medium, $L_1$ denotes the principal distance and $\theta$ denotes the temperature.

Since the propagation speed is highly dependent on the temperature of the medium, the temperature of the medium must be additionally measured in order to be able to carry out a temperature correction. A temperature sensor comprising a following, involved measuring electronic circuit is used for this purpose.

Furthermore, the propagation speed is a specific function of the medium, with a consequence that the measuring electronic circuit must evaluate a characteristic or an equation for the specific propagation speed for each medium. In the known arrangements, the measuring electronic circuits employed must therefore be adapted to each medium in a technically-involved manner.

SUMMARY OF THE INVENTION

It is therefore the object of the present invention to reliably identify the position of a reflector with the assistance of ultrasonic pulses in a simple manner without aperture measurement.

The above object is achieved, according to the present invention, in an arrangement of the type set forth above which is particularly characterized in that a secondary transducer is provided and is connected to the measuring device, the secondary transducer, as with the main transducer, serving as a transmitter and a receiver of an ultrasonic pulse which propagates along a subsidiary distance from the secondary transducer to the rear side of the reflector and back with a subsidiary transit time. The reflector is arranged between the main transducer and the secondary transducer. An overall distance, which is equal to the sum of the principal distance and the subsidiary distance is constant between the main transducer and the secondary transducer. The measuring device identifies the subsidiary transit time and calculates the position value from the subsidiary transit time, the principal transit time, the overall distance and the reference position.

The present invention is based on the perception that the relationship between the principal distance and the subsidiary distance is no longer dependent on the temperature-dependent and medium-associated propagation speed and is only defined by the quotients of the measured transit times $$L_1/L_2 = t_1/t_2$$

in which $L_1$ is the principal distance, $L_2$ is the subsidiary distance, $t_1$ is the principal transit time and $t_2$ is the subsidiary transit time. With the introduction of the constant, overall distance g between the main transducer and the secondary transducer, the subsidiary distance or principal distance can be specified in accordance with the following equations, after a brief calculation, these equations now being only dependent on the principal transit time and the subsidiary transit time and on the constant overall distance g:

$$L_1 = \frac{t_1}{t_1 + t_2} \cdot g \tag{3}$$

$$L_2 = \frac{t_2}{t_1 + t_2} \cdot g. \tag{4}$$

A position value identifying the position of the reflector, i.e. for example the distance of the reflector from an arbitrary reference position, can be specified from equations (3) and (4). This reference position can lie between the main transducer and the secondary transducer or can lie in the region outside of the main transducer and secondary transducer and marks a zero point proceeding from which the position value can assume a positive operational sign or negative operational sign, dependent on the direction of the deviation from the zero point.

Even after outage of one of the two ultrasonic transducers, a feature of the invention also enables the position of the reflector to be identified with the assistance of the operating ultrasonic transducer. As a result thereof, the arrangement of the present invention offers a considerably-enhanced reliability which benefits the user, for example given apparatus of production engineering.

Among other things, the present invention can be employed in motor vehicle technology in order to identify, for example, displacements of steering tie rods or to identify the dipping depth in vehicle suspensions. However, the tool positioning of electrically-controlled machine tools or the opening control in a valve in production engineering can be identified with the assistance of the invention.

The invention is further characterized in that the reference position is adjustable.

The invention is further characterized in that the reference position lies in the middle between the main transducer and the secondary transducer.

The invention is particularly characterized in that the measuring device contains a transfer device comprising a selection transfer switch which alternately connects the secondary transducer and the main transducer to the measuring device and a function transfer switch which cyclically switches between a transmission unit and a receiving unit, a timer that measures the principal and subsidiary transit times, a pilot control that is connected to the transmission unit, the receiving unit, the timer and the switching device and controls transmission, reception of the ultrasonic pulses and the measurement of the transfer times, and a main control to which the pilot control, the timer, a calculating portion, a main memory and an input/output unit are coupled and which controls the calculation of the position values from the transit times.

According to another feature of the invention, the invention is particularly characterized in that a check device that is connected to the main control checks on the basis of the measured principal and subsidiary transit times to determine whether the main transducer and the secondary transducer are functional.

According to another feature of the invention, the invention is particularly characterized in that the two most recent measured values for the principal transit time and the subsidiary transit time are stored in the main memory.

According to another feature of the invention, an emergency running device is provided in the measuring device, the emergency running device calculating a reference time by summing the stored values when the check device identifies an outage of the main transducer or of the secondary transducer and calculating the positional value for the position of the reflector from the measured principal transit time and subsidiary transit time, the overall distance, the reference position and the reference time.

BRIEF DESCRIPTION OF THE DRAWING

Other objects, features and advantages of the invention, its organization, construction and operation will be best understood from the following detailed description, taken in conjunction with the accompanying drawing on which there is a single FIGURE which is a schematic representation of an exemplary embodiment of the invention.

DESCRIPTION OF THE PREFERRED EMBODIMENTS

Referring to the drawing, a reflector 10 is secured to an arbitrary, movable body 1 whose distance from a reference position is to be identified. The reflector 10 has an ultrasonic reflecting front side 101 and rear side 102 and is arranged between a primary transducer 2 and a secondary transducer 3. Piezoelectric ultrasonic transducers of identical type, each comprising an ultrasonic emission plane, are utilized as the primary transducer 2 and the secondary transducer 3, these transducers working with quartz crystals and being capable of both transmitting and receiving ultrasonic pulses.

The front side 101 of the reflector 10 faces toward the main transducer 2 and has a principal distance h therefrom. The rear side 102 is directed towards the secondary transducer 3 and has the subsidiary distance z therefrom. The front side 101 and the rear side 102 of the reflector 10 are thereby aligned parallel to the ultrasonic emission plane of the secondary transducer 3 and of the primary transducer 2 so that the path that the ultrasonic pulse is traversed from the primary transducer 2 and the secondary transducer 3 to the reflector and back does not deviate from the principal distance h or, respectively, subsidiary distance z.

The ultrasonic pulses emitted from the primary transducer 2 and the secondary transducer 3 have a pulse duration that is negligibly small in comparison to the principal or, respectively, subsidiary transit time, this being done in order to achieve a high resolution.

The primary transducer 2 and the secondary transducer 3 are connected to a measuring device 4 which contains a transfer device 41, a transmission unit 42, a receiving unit 43, a timer 44, a pilot controlled device 45, a primary control device 46, a checking device 461, an emergency running device 462, a calculator device 47, a primary memory 48 and an input/output unit 49.

The transfer device 41 has a selection transfer switch 411 which lies in series with a function transfer switch 412. The transfer switches are realized with switching transistors.

The selection transfer switch 411 alternately connects the primary transducer 2 and the secondary transducer 3 to the measuring device 4.

The function switch 412 switches between the transmitter 42 and the receiver 43.

The transmitter 42 of the measuring device 4 comprises a pulse generator including a transmission amplifier which generates the pulses for the electro-acoustical conversion in the primary transducer 2 or in the secondary transducer 3.

The receiver 43 has a receiving amplifier comprising pulse shaping for further processing of the electrical pulses output by the ultrasonic transducers.

The pilot control 45 is constructed as a sequential logic system and controls the transfer device 41. Upon instruction of the primary control portion 46, furthermore, the pilot control initiates the transmitter to transmit an electrical pulse and simultaneously starts the timer 44. Furthermore, the pilot control 45 is connected to the receiver 43.

The timer 44 comprises an integrated circuit, a programmable interval timer including a counter, and has the task of identifying the principal transit time and the subsidiary transit time. The interval timer makes the measured principal transit time and the subsidiary transit time available to the primary control device 46, on demand, and is connected thereto.

The calculator portion 47 has the job of calculating the positional value for the position of the reflector 10 between the primary transducer 2 and the secondary transducer 3, calculating the subsidiary distance z and the principal distance h from the measured principal and subsidiary transit times, as well as the overall distance g, and the defined reference position upon demand by the primary control portion 46. The aforementioned output quantities required therefore are received in the calculating portion 47 from the main control portion 46.

The main control portion 46 deposits the measured quantities, such as subsidiary and principal transit times, and the calculated quantities, such as the subsidiary distance z, the principal distance h and the positional value, and also stores the constant overall distance g and the defined reference position in the primary memory 48 that is connected to the main control portion, which memory can be, for example, a random access memory (RAM).

The primary control portion 46 is constructed as a sequential logic system and is connected to the pilot control 46, to the timer 44, to the calculating portion 47 and to the memory 48, from which it fetches the stored data, as needed.

Furthermore, the primary control portion 46 is connected by way of an input/output unit 49 for exchanging information with a peripheral device 5 which can be constructed as a bus comprising data, address and control lines.

The primary control portion coordinates a measuring cycle that can be executed in accordance with the following pattern.

The main control portion 46 outputs the start instruction for the measurement of the principal transit time to the pilot control 45. In response thereto, the pilot control 45 selects the transfer device 41 in which the selection transfer switch 411 is switched to the primary transducer 2 and the function switch 412 is switched to the transmission unit 42 in order to connect the primary transducer 2 to the transmitter 42.

Subsequently, the pilot control 45 selects the transmitter 42 which, in response thereto, outputs an electrical pulse to the primary transducer 2 which emits an ultrasonic pulse. At the same time, the pilot control 45 starts the timer 44.

With a short delay, the pilot control 45 selects the transfer device 41 in which the function switch 412 is now switched to the receiving unit 43.

The primary transducer 2 receives the reflected ultrasonic pulse and outputs an electrical pulse to the receiver 43 which stops the timer 44 in response thereto and notifies the pilot control 45 of the reception of a pulse. The timer 44 informs the primary control 46 that it can fetch the measured result (principal transit time).

In response thereto, the primary control 46 accepts the value for the principal transit time, resets the timer 44 and stores the value of the principal transit time in the primary memory 48.

The primary control 46 subsequently outputs a further start instruction to the pilot control 46.

The identification of the subsidiary transit time follows in the measuring cycle. To this end, the transfer device 41 now connects the secondary transducer 3 to the measuring device 4 and the subsidiary transit time is measured and stored, all in the same manner as set forth in conjunction with the primary transducer 2.

The primary control 46 now orders the calculating portion 47 to identify the positional value $L_x$ in accordance with the following relationship which is derived from the expressions (3) and (4)

$$L_x = \frac{t_1 - t_2}{t_1 + t_2} \cdot \frac{g}{2}. \tag{5}$$

It is thereby assumed that the reference position lies in the precise center between the primary transducer 2 and the secondary transducer 3.

A measuring cycle is concluded with the output of the positional value to the primary control 46. The primary control 46 can then output the positional value to a peripheral unit 5 by way of the input/output device 49.

The primary control 46 additionally comprises a check device 461 which checks the primary transducer 2 and the secondary transducer 3 for operability on the basis of the measured principal and subsidiary transit times. To this end, the check device 461 calculates the principal distance h and the subsidiary distance z according to equations (4) and (5) and compares the sum of the two distances to the overall distance g. Alternatively, the check device 461 can also interpret the sum of the transit times which, given operable transducers, must lie within the limited range despite temperature errors.

When the check device 461 determines that either the primary transducer 2 or the secondary transducer 3 is malfunctioning, it reports the same to the primary control 46 which undertakes a modification of the measuring cycle in response thereto. To this end, the primary control 46 has an emergency running device 462 which sums up the stored values for the subsidiary and principal transit time of the preceding, unmodified measuring cycle stored in the primary memory 48 to form a reference time which is likewise stored in the main memory 48.

In the following, modified measuring cycle, the emergency running device 462 instructs the calculating portion 47 to calculate the positional value for the position of the reflector 10 according to the modified equation (6) below from the reference time, the principal or subsidiary transit time, that is assigned to the still operating ultrasonic transducer, the overall distance g and the defined reference position, to wit:

$$L_x = \frac{t_0 - 2t_2}{t_0} \cdot \frac{g}{2}. \tag{6}$$

Equation (6) holds true in this form when the secondary transducer 3 in still operable, wherein $t_0$ denotes the reference time.

When the positional value is identified according to equation (6), there is no longer any temperature compensation, i.e. the positional value is affected by a temperature error. The primary control 46 can inform the peripheral unit 5 of this situation by way of the input/output device 49.

For example, what reference position is to be set can be communicated to the primary control 46 by the peripheral unit 5 by way of the input unit 49.

A fast one-chip microcomputer can be used as the primary control 46, this additionally containing the function of the calculator 47, the main memory 48, the check device 461, the emergency running device 462, the timer 44 and the input/output unit 49.

The functions of the check device 461 and of the emergency running device 462 can be implemented as subprograms of a higher-ranking main program on which the control of the measuring cycle is based in the one-chip microcomputer.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An arrangement for identifying the position of a movable body with ultrasonic energy, comprising:
    a primary transducer operable as a transmitter and as a receiver for ultrasonic pulses;

a reflector attached to the movable body and including a reflecting front side and a reflecting rear side which reflects an ultrasonic pulse transmitted from the primary transducer from said front side back in the direction of said primary transducer;

measuring apparatus connected to said primary transducer and operable to identify a principal transit time per ultrasonic pulse required by the ultrasonic pulse along a principal distance between said primary transducer and said reflector and from said reflector back to said primary transducer and which identifies a positional value therefrom representing the position of said reflector relative to a reference position having a reference distance from said primary transducer;

a secondary transducer connected to said measuring apparatus and operable as a transmitter and a receiver of ultrasonic pulses which propagate along a subsidiary distance from said secondary transducer to said rear side of said reflector and back with a subsidiary transit time;

said reflector being arranged between said primary transducer and said secondary transducer;

said primary and said secondary transducers being spaced apart a predetermined distance which is equal to the sum of said principal distance and said subsidiary distance and which remains constant between said primary transducer and said secondary transducer; and said measuring apparatus including means for identifying said subsidiary transit time and calculating said positional value from said subsidiary transit time, said principal transit time, said predetermined distance and said reference position.

2. The arrangement of claim 1, and further comprising:
means for adjusting said reference position.

3. The arrangement of claim 2, wherein:
said reference position lies between said primary transducer and said secondary transducer.

4. The arrangement of claim 3, wherein:
said measuring apparatus comprises a transfer device including a selection transfer switch which is operable to alternately connect said secondary transducer and said primary transducer to said measuring apparatus, a transmission unit and a receiving unit, and a function transfer switch operable to cyclically switch between said transmission unit and said receiving unit;

a timer connected to said receiving unit for measuring said principal and subsidiary transit times;

a pilot control connected to said timer, to said reception unit and to said transmission unit and to said transfer device for controlling transmission and reception of said ultrasonic pulses as well as the measurement of said transit times;

a calculator;

a primary memory;

an input/output unit; and a primary control connected to said pilot control, said timer, said calculator, said primary memory and said output unit for controlling the calculation of said positional values from said transit times.

5. The arrangement of claim 4, and further comprising:
check means connected to said primary control for checking the basis of the measured principal and subsidiary transit times to determine whether said primary transducer and said secondary transducer are operational.

6. The arrangement of claim 5, and further comprising:
means for storing the two most recent measured values of said principal transit time and said subsidiary transit time in said primary memory.

7. The arrangement of claim 6, and further comprising:
emergency running means in said measuring apparatus for calculating a reference time by summing said stored values when said check means identifies an outage of said primary transducer or of said secondary transducer and calculating said positional value for the position of said reflector from said measured principal and subsidiary transit times, said predetermined distance therebetween, said reference position and said reference time.

* * * * *